United States Patent
Zocca et al.

(10) Patent No.: US 11,907,793 B2
(45) Date of Patent: Feb. 20, 2024

(54) SYSTEM AND METHOD FOR SELECTING A QUALITY GRADE METRIC PROFILE FOR ASSURING OPTIMAL CONTROL OF SYMBOL QUALITY IN A DPM PROCESS

(71) Applicant: Datalogic IP Tech S.R.L., Calderara di Reno (IT)

(72) Inventors: Rinaldo Zocca, Argelato (IT); Lorenzo Bassi, Ivrea (IT); Clemente Iannone, Bologna (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 0 days.

(21) Appl. No.: 16/958,547

(22) PCT Filed: Dec. 20, 2018

(86) PCT No.: PCT/EP2018/086142
§ 371 (c)(1),
(2) Date: Jun. 26, 2020

(87) PCT Pub. No.: WO2019/129632
PCT Pub. Date: Jul. 4, 2019

(65) Prior Publication Data
US 2021/0065093 A1 Mar. 4, 2021

Related U.S. Application Data
(60) Provisional application No. 62/611,497, filed on Dec. 28, 2017.

(51) Int. Cl.
*G06K 5/00* (2006.01)
*G06K 5/04* (2006.01)
(Continued)

(52) U.S. Cl.
CPC ............. *G06K 5/04* (2013.01); *G06F 17/18* (2013.01); *G06K 5/00* (2013.01);
(Continued)

(58) Field of Classification Search
CPC ......... G06Q 10/06395; G06Q 10/0875; G06K 5/00; G06K 7/1417; G06K 9/2027; G06K 9/20; G06K 50/04
See application file for complete search history.

(56) References Cited

U.S. PATENT DOCUMENTS

| 9,552,506 B1* | 1/2017 | Nadabar | G06K 9/20 |
| 2003/0120416 A1* | 6/2003 | Beggs | G06Q 10/06 |
| | | | 701/100 |

(Continued)

FOREIGN PATENT DOCUMENTS

| WO | 2009005789 A1 | 1/2009 |
| WO | 2012138758 A1 | 10/2012 |

OTHER PUBLICATIONS

Kohavi, Ron. Longbotham, Roger. Online Controlled Experiments and A/B Tests. Jan. 2016 (Year: 2016).*

(Continued)

*Primary Examiner* — Johnna R Loftis
(74) *Attorney, Agent, or Firm* — Foley & Lardner LLP

(57) ABSTRACT

A computer-implemented system and process of producing a metric quality grade profile for use during inspection of DPM symbol marked on parts may include storing average metrics measured in a controlled environment for a "golden" sample. Measurements of the DPM symbol of the "golden" sample may be performed. Measurements of the metrics of the "golden" sample in an uncontrolled environment may be performed. Average metrics from the uncontrolled environment may be calculated. The averaged metrics from the controlled and uncontrolled environment may be compared.

(Continued)

The user may be enabled to set an acceptable grade for the individual metrics. The acceptable grades for the individual metrics as a profile of the DPM symbol in memory.

22 Claims, 15 Drawing Sheets

(51) Int. Cl.
| | |
|---|---|
| *G06F 17/18* | (2006.01) |
| *G06Q 10/0639* | (2023.01) |
| *G06Q 10/0875* | (2023.01) |
| *G06Q 10/10* | (2023.01) |
| *G06Q 50/04* | (2012.01) |
| *G06T 7/00* | (2017.01) |
| *G07C 3/14* | (2006.01) |
| *G06K 7/14* | (2006.01) |
| *G06K 7/10* | (2006.01) |

(52) U.S. Cl.
CPC ... *G06Q 10/06395* (2013.01); *G06Q 10/0875* (2013.01); *G06Q 10/10* (2013.01); *G06Q 50/04* (2013.01); *G06T 7/0004* (2013.01); *G07C 3/143* (2013.01); *G06K 7/1413* (2013.01); *G06K 7/1417* (2013.01); *G06K 2007/10524* (2013.01); *G06T 2207/30204* (2013.01)

(56) References Cited

U.S. PATENT DOCUMENTS

| | | | | |
|---|---|---|---|---|
| 2006/0213999 | A1* | 9/2006 | Wang | G06K 7/1093 |
| | | | | 235/462.25 |
| 2008/0105748 | A1* | 5/2008 | Lei | G06K 7/10722 |
| | | | | 235/462.42 |
| 2008/0133383 | A1* | 6/2008 | Regan | G06Q 10/087 |
| | | | | 705/28 |
| 2009/0108073 | A1* | 4/2009 | Gerst | G06K 7/1095 |
| | | | | 235/462.41 |
| 2011/0206269 | A1* | 8/2011 | Tyler | G06V 10/993 |
| | | | | 382/141 |
| 2012/0079897 | A1* | 4/2012 | Kavusi | G01N 33/48707 |
| | | | | 73/865.6 |
| 2013/0228619 | A1* | 9/2013 | Soborski | G06K 19/086 |
| | | | | 235/462.25 |
| 2018/0314867 | A1* | 11/2018 | Kotula | G06K 9/00523 |
| 2019/0145904 | A1* | 5/2019 | Lopez | G01N 21/90 |
| | | | | 356/239.4 |

OTHER PUBLICATIONS

Sabreen, Scott. Q&A: Data Matrix Bar Code Mark Quality Verification and Standard. Aug. 14, 2012. from https://plasticsdecorating.com/enews/2012/plastics-decorating-enews-10/ (Year: 2012).*
International Search Report and Written Opinion corresponding to PCT/EP2018/086142, dated Apr. 15, 2019, 11 pages.

* cited by examiner

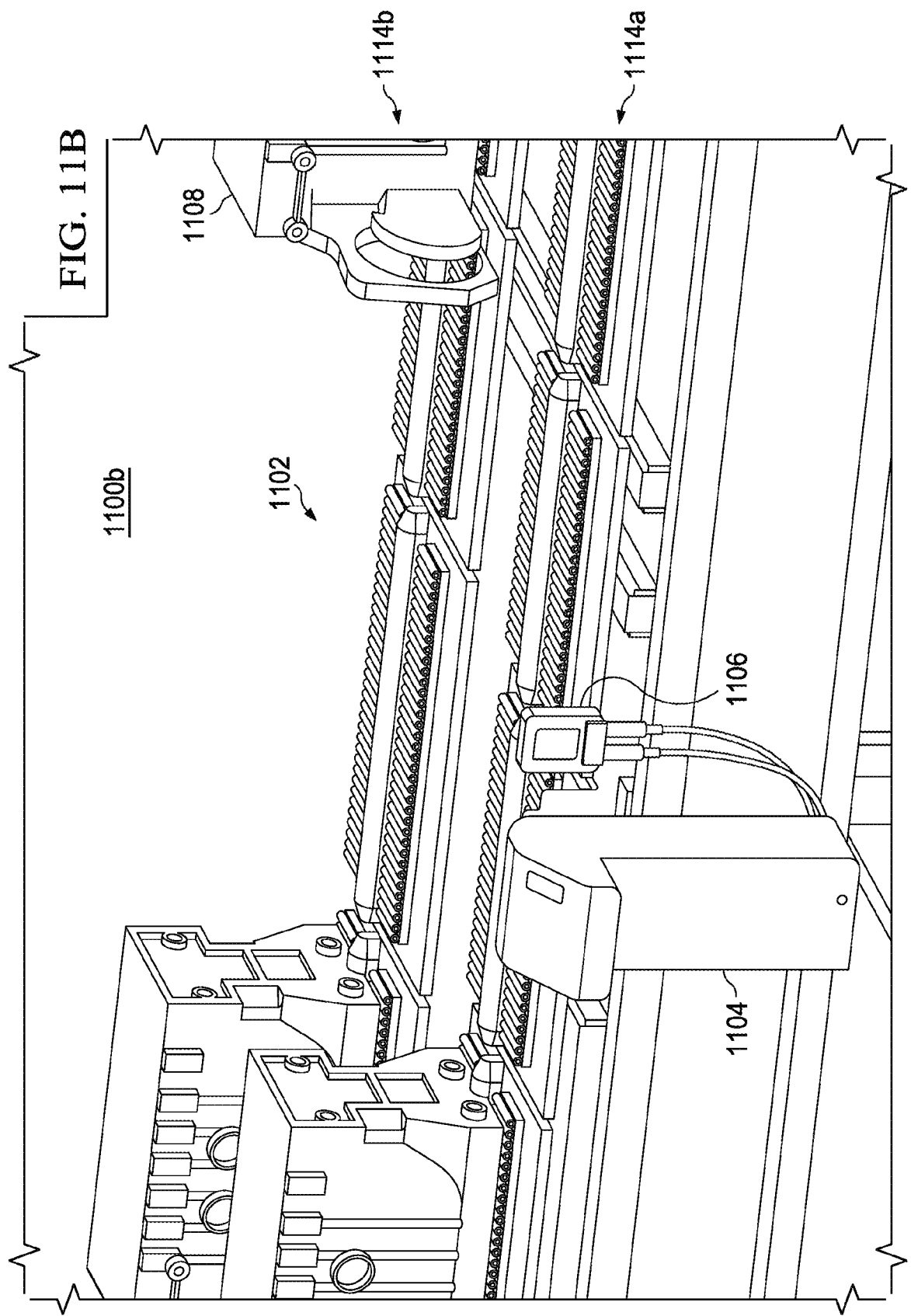

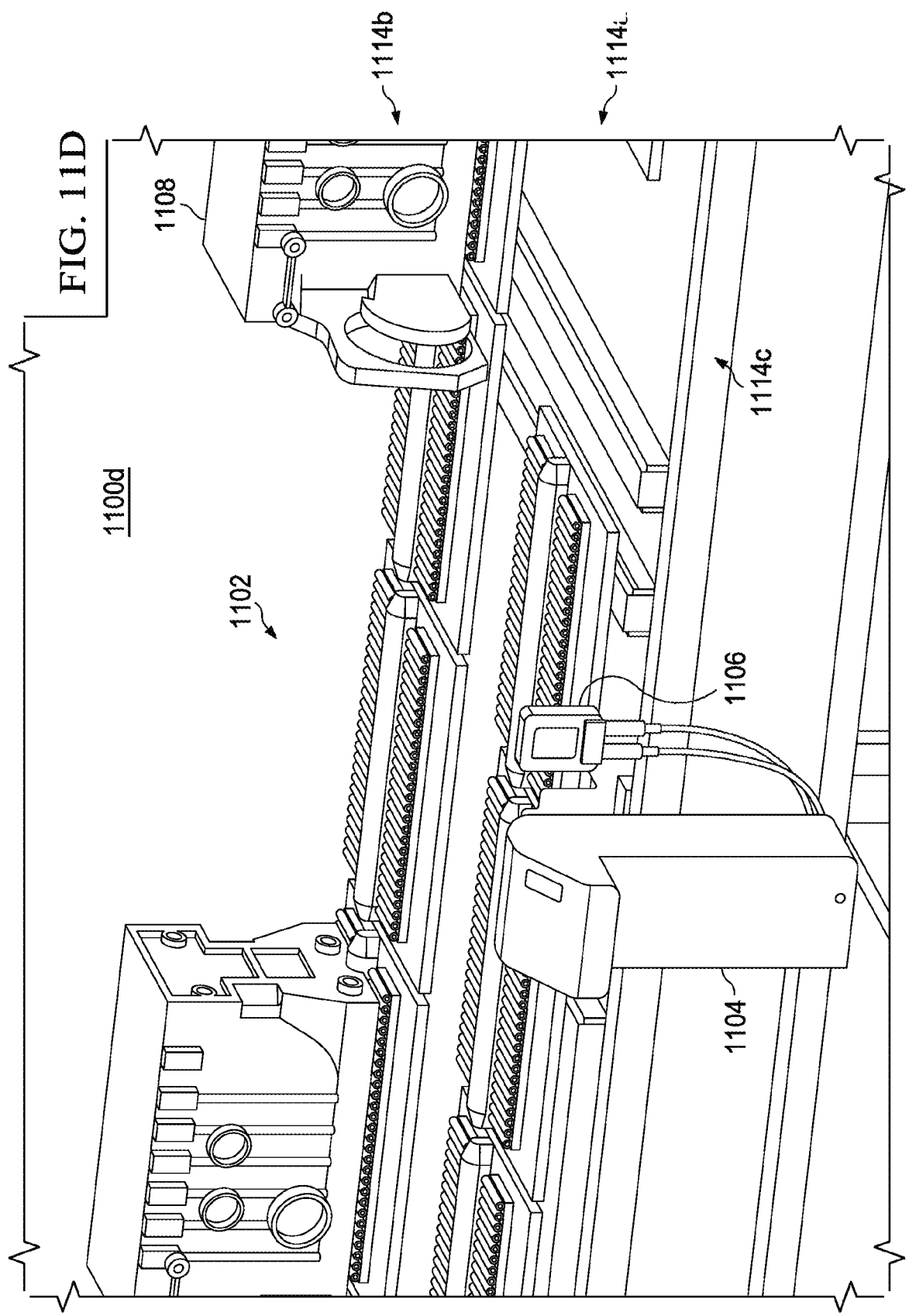

SYSTEM AND METHOD FOR SELECTING A QUALITY GRADE METRIC PROFILE FOR ASSURING OPTIMAL CONTROL OF SYMBOL QUALITY IN A DPM PROCESS

CROSS REFERENCE TO RELATED APPLICATIONS

This is a 371 National Stage application that claims benefit of priority from PCT/EP2018/086142, filed Dec. 20, 2018, which claims priority to U.S. Provisional Application having Ser. No. 62/611,497, filed on Dec. 28, 2017; the contents of which are incorporated herein by reference in their entirety.

FIELD OF THE INVENTION

The present invention relates to detecting part marking (DPM) symbols, and in particular, to improving inline quality grading of DPM symbols by enabling grading of individual metrics to be set.

BACKGROUND OF THE INVENTION

Direct part marking (DPM) is a technique used to mark parts with machine-readable indicia or symbols that can be read during production, inspection, and/or logistics, for example. Because of the importance of being able to track specific parts produced for inclusion in equipment, such as automobiles, airplanes, military equipment, for example, it is important that the DPM symbols measured on the parts are well formed (e.g., with sufficient contrast and with proper geometric shape). If the DPM symbols are not easily read or unable to be read, problems at different supply chain operations, such as staging, assembly, or otherwise, may result, thereby resulting in lost time, productivity, cost, possible machine failure, and/or risk to human lives.

Inline quality grading is used to perform verification of quality and readability by examining optical characteristics of the code according to industry standards and specifications, which are generally defined by an international organization, such as the ISO, and industry groups. By performing inline quality grading, parts that are printed with low-quality may be identified as being poorly marked and removed from production. Conventional quality grading is computed using a set of metrics, often nine or more metrics, that are given grades {A, B, C, D, F} or in an equivalent manner {4, 3, 2, 1, 0}, and then an overall grade is computed by being set to the lowest grade of all the metrics. The overall grade is used for accepting or rejecting the marked part based on the lowest grade of all the metrics measured during optical inspection.

More specifically, during inspection, the DPM symbols or markings on the parts may be optically inspected to determine the quality of the markings. In addition to being able to determine that a marking system (e.g., laser etching system) might be having problems, the inspection system that reads the markings on a part may be able to determine that the part itself is defective as a result of the marking or symbol read having a grade lower than an acceptable grade. Typical problems of parts that may be determined include problems with material (e.g., metal or plastic) of the part being weak, cracked, mal-formed, or otherwise defective, or problems with material surface quality (e.g., finishing quality, dust, oil). Also, problems of the marking system can be detected by, for example, loss of power or breakage or malfunction of deflecting mirrors used for marking products with DPM symbols. There are typically a certain level of acceptable failure rates of parts that occur in production, and at least a portion of that level results through inspection of the DPM symbols.

As understood in the art, quality grade standard specifications define industry standards for determining DPM quality are meant to be used in controlled environments. Verifiers of the DPM quality must apply the specification algorithm, but also create a controlled environment, such as a verification room, with controlled illumination and isolation from external interference and environmental conditions (e.g., vibrations, temperature variations, etc.).

In a mark and read system, rather than being performed in a controlled environment, the mark and read system is performed in a manufacturing environment, which is a significantly more difficult environment to control due to lighting and other environmental conditions. As a consequence, some metrics may have a grade that is typically lower from measurements made in a verification room. In this context, the overall grade becomes meaningless because a single metric with a low value masks or hides all of the other metrics. As an example, if one metric value is lower in a production environment than in a controlled environment, it is not possible to determine which metric is lower or what, if anything, is happening with any of the other metrics as only the overall (i.e., lowest) metric grade is used to accept or reject the part to comply with industry standards. Accordingly, there is a need to create a mark and read system that is more robust for production environments.

BRIEF SUMMARY OF THE INVENTION

To overcome the problem of a quality grade with a low value masking or hiding other quality grade metrics, a system and method that enables a profile to be created for each individual metric that allows for a minimum acceptable grade to be customized for each individual metric may be provided. In some cases, one or more metrics may be excluded from being considered when determining a quality grade. In an embodiment, an automated process for defining the metric profile to use that is optimal for process control may be established. The system may enable a user to set threshold values for each of the individual metrics that may be compared to the individual metrics that are measured, thereby enabling the system to consider each of the metrics individually when performing an inspection during production, thereby allowing a user to control failure rates.

One embodiment of a system for inspecting direct part marking (DPM) symbols may include an imaging device, such as a barcode scanner or reader, a memory configured to store a profile inclusive of acceptable grades for each of a plurality of metrics of the DPM symbols, and a processing unit in communication with the imaging device and memory. The processing unit may be configured to receive an image of a DPM symbol on a part imaged by said imaging device. A determination of grades of the metrics may be made. A determination as to whether any of the grades of the metrics are below the acceptable grades of the respective metrics may be made. In response to determining that a grade of a metric is below an acceptable grade, initiate an action in processing the part, otherwise, not initiate the action. The action may be a physical action in which the part is automatically moved from being in-line to being moved out-of-line (e.g., scrap), DPM symbol is voided, DPM symbol is re-imprinted, or otherwise.

One embodiment of a computer-implemented process for inspecting direct part marking (DPM) symbols may include receiving an image of a DPM symbol on a part. Grades of individual metrics from the image may be determined. A determination as to whether any of the grades of the metrics are below acceptable grades from a profile of the respective metrics may be made. In response to determining that a grade of a metric is below an acceptable grade of that metric, an action in processing the part may be initiated, otherwise, the action may not be initiated.

One embodiment of a computer-implemented process of producing a metric quality grade profile for use during inspection of DPM symbol marked on parts may include storing official metrics measured in a controlled environment for a "golden" sample. Measurements of the DPM symbol of the "golden" sample may be performed. Measurements of the metrics of the "golden" sample in an uncontrolled environment may be performed. Statistical distribution of metrics from the uncontrolled environment may be calculated. The official metrics from the controlled environment and statistical distributions of metrics from the uncontrolled environment may be compared. In an embodiment, an acceptable grade may be set for the individual metrics. The acceptable grade may be set by a user via a user interface, for example. The acceptable grades for the individual metrics may be stored in a memory as a profile in association with the DPM symbol.

BRIEF DESCRIPTION OF THE DRAWINGS

Illustrative embodiments of the present invention are described in detail below with reference to the attached drawing figures, which are incorporated by reference herein and wherein:

FIGS. 11A-11D, illustrations of illustrative materials handling equipment on which a processing system in communication with a barcode reader configured to read DPM symbols.

DETAILED DESCRIPTION OF THE INVENTION

Figure 1A:
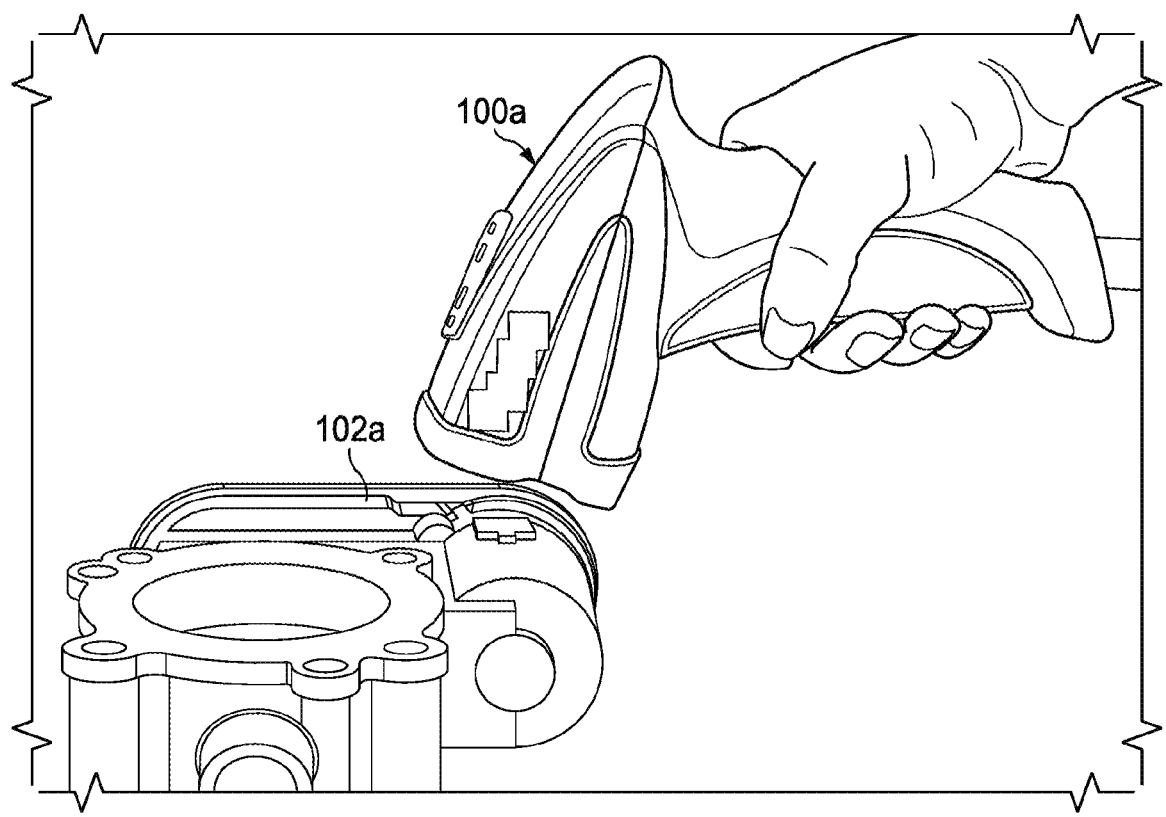
FIG. 1A and FIG. 1B are illustrations of a conventional handheld barcode scanner and a fixed barcode scanner, respectively.
Figure 1B:
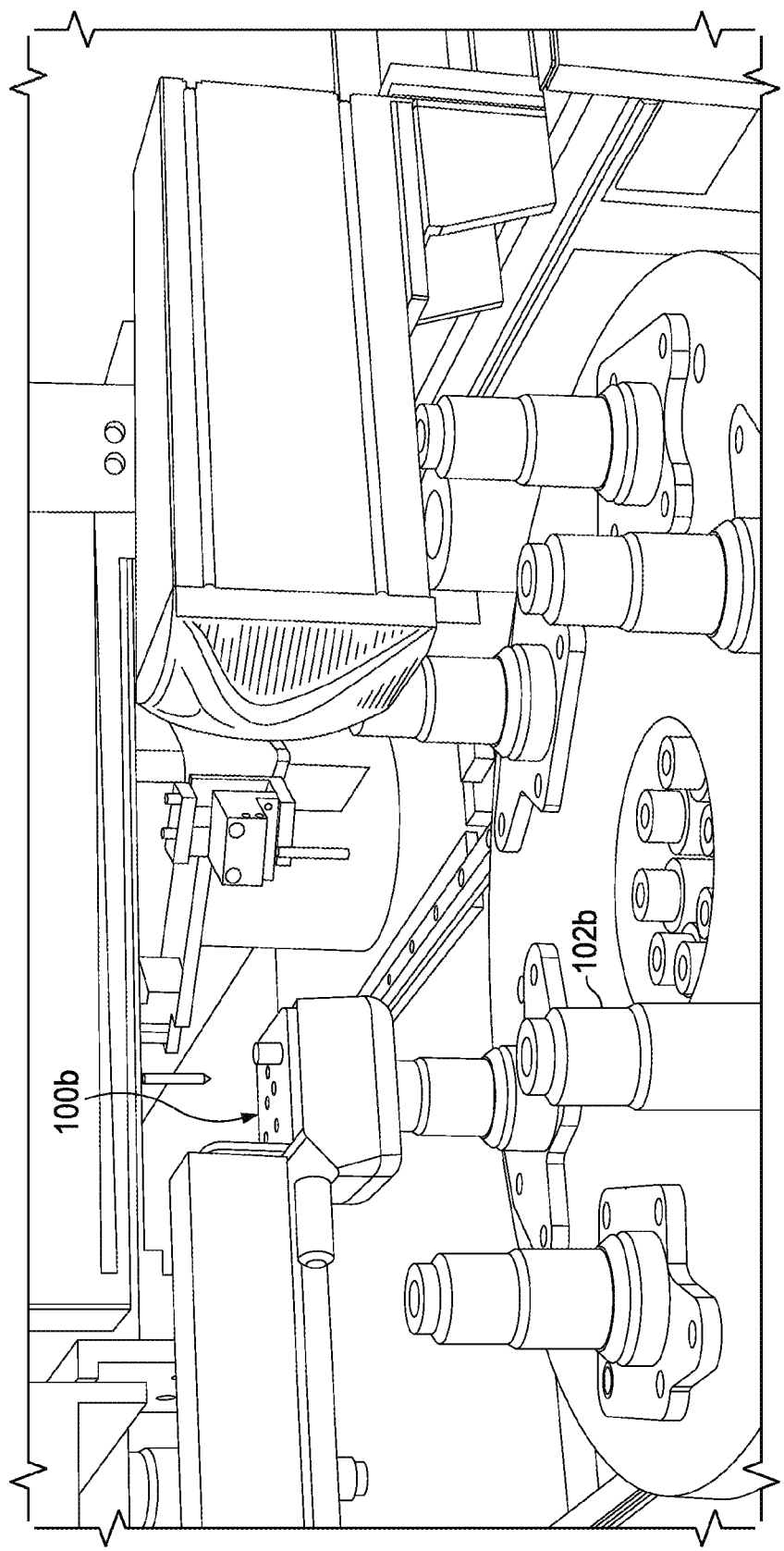

With regard to FIG. 1A and FIG. 1B, illustrations of a conventional handheld barcode scanner 100a and a fixed barcode scanner 100b, respectively, are shown. In some embodiments, the handheld barcode scanner 100a and/or the fixed barcode scanner 100b may be direct part marking (DPM) barcode scanners capable of reading barcodes or other machine-readable indicia that are etched or imprinted directly into a surface of objects 102a and 102b. The machine-readable indicia etched into the surface are generally known as DPM symbols or markings, and the DPM symbols are typically inspected to confirm that the symbols can be optically read to ensure that the DPM symbols were properly imprinted (e.g., laser etched) and can be read by other readers in the future during other stages of a supply chain, production facility, and so forth. The barcode scanner 100b may be part of an inspection system, as further described herein.

Figure 2:
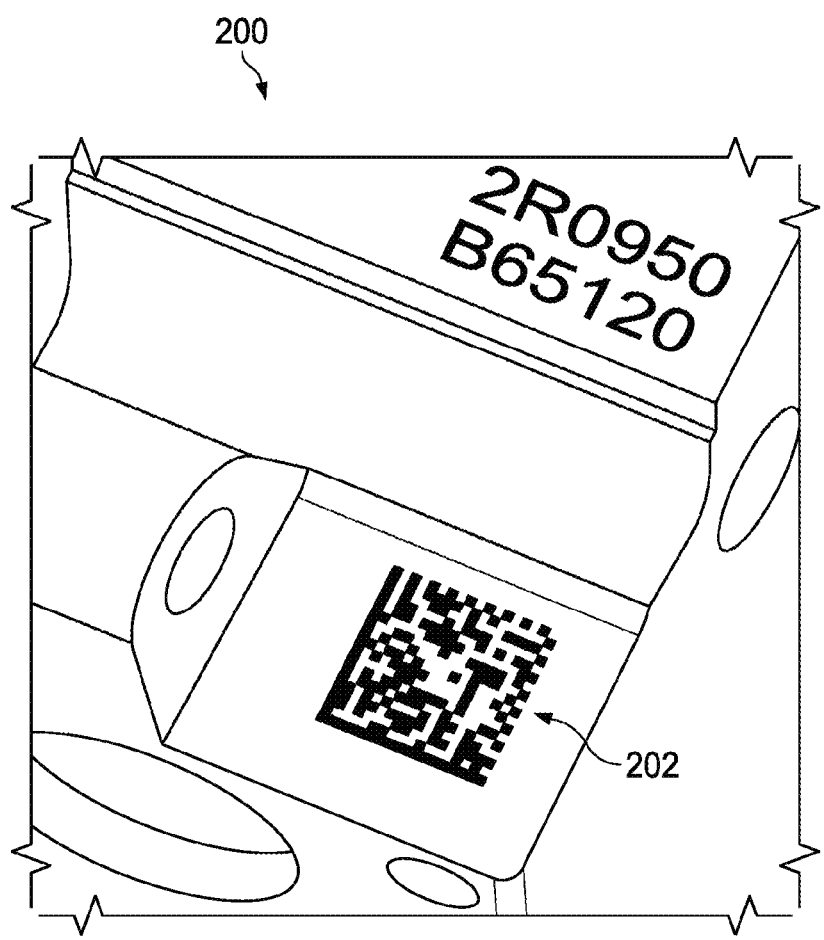
FIG. 2 is an illustration of an illustrative part having a DPM symbol imprinted thereon.

With regard to FIG. 2, an illustration of an illustrative part 200 having a DPM symbol imprinted thereon is shown. In this case, it can be seen that the part 200 and DPM symbol 202 are well lit as the DPM symbol 202 is being measured by a verifier in a controlled setting, such as a measurement lab with high quality lights and limited environmental impacts on the measurements.

Figure 3:
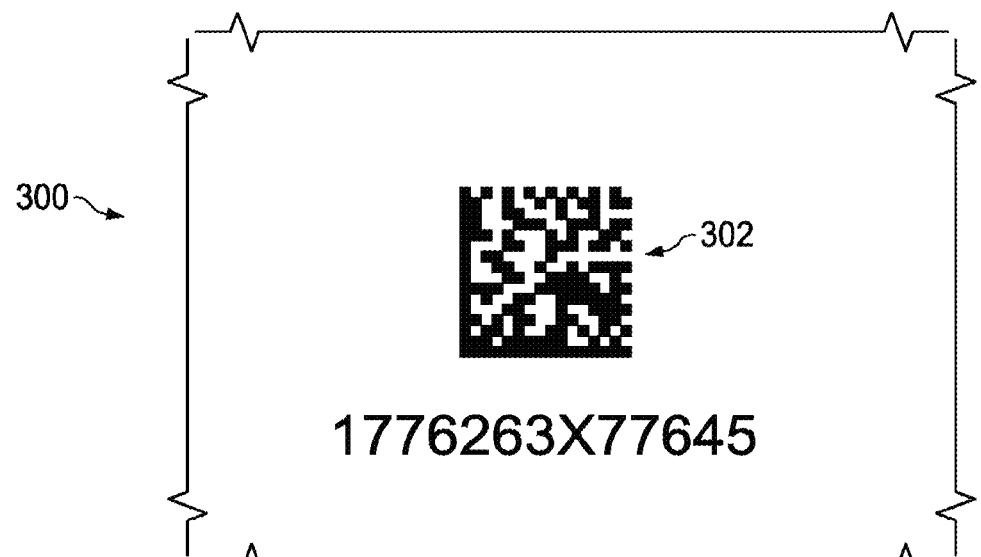
FIG. 3 is an image of an illustrative part having a DPM symbol imprinted thereon.

With regard to FIG. 3, an image of an illustrative part 300 having a DPM symbol 302 imprinted thereon is shown. As can be seen, the quality of the image of the part 300 is degraded as a result of being captured within an uncontrolled environment, such as on production equipment on a manufacturing floor. In this case, brightness and sharpness levels may impact measurement metrics when reading the DPM symbol.

Figure 4:
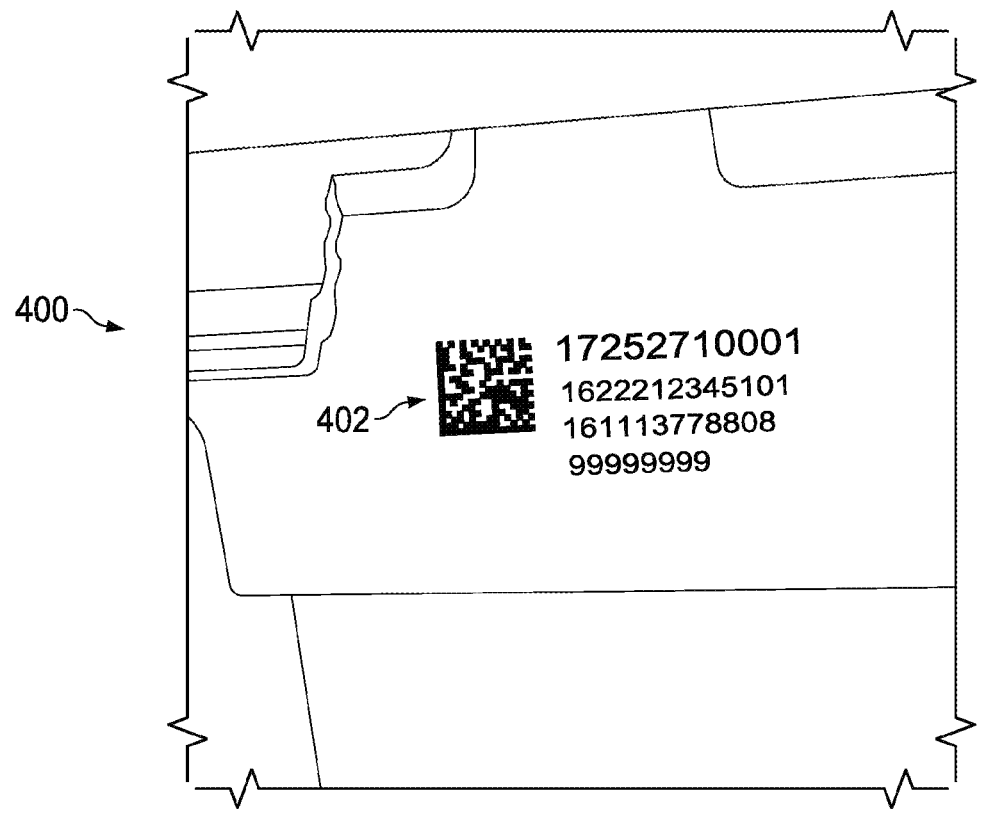
FIG. 4 is an image of an illustrative part including a DPM symbol imprinted thereon.

With regard to FIG. 4, an image of an illustrative part 400 including a DPM symbol 402 and printed thereon is shown. As with FIG. 3, the image of the part 400 is captured in a manufacturing facility as opposed to a controlled environment, and the image of the DPM symbol 400 on the part 400 is degraded. As a result of the image being degraded, individual metrics often have reduced metric grades as compared to grades of the individual metrics when the DPM symbol 402 is measured in a controlled environment by a verifier due to lighting and environmental impacts during imaging of the DPM symbol 402 on the part 400.

Figure 5:
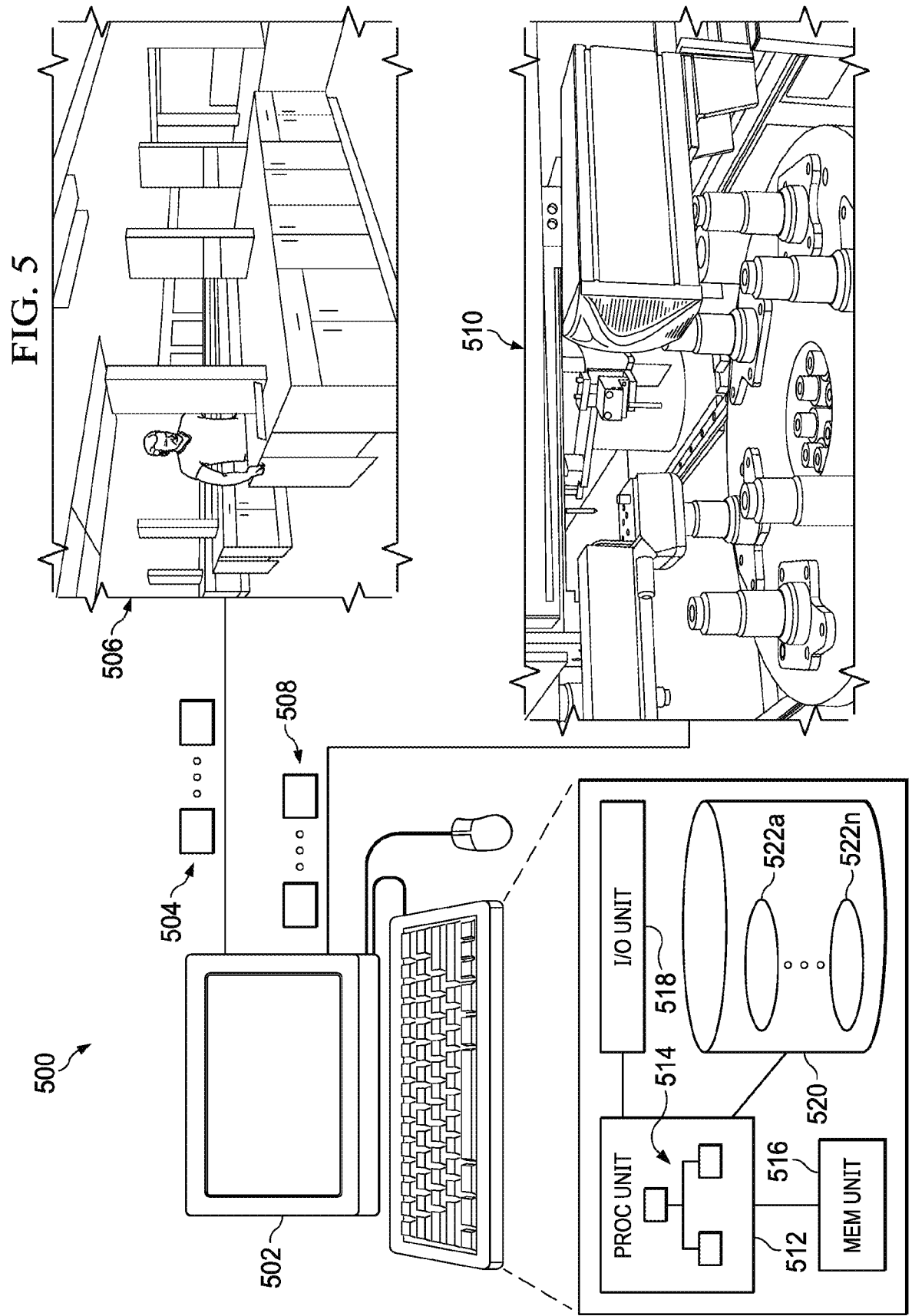
FIG. 5 is an illustration of an illustrative environment in which a computing system that may be used during an inspection process of DPM symbols.

With regard to FIG. 5, an illustration of an illustrative environment 500 in which a computing system 502 that may be used during an inspection process of DPM symbols is shown. The computing system 502 may receive (i) image data 504 of a DPM symbol on a part captured by a barcode reader or other imaging device 505 in a controlled environment 506 and (ii) image data 508 of the DPM symbol on parts captured in an uncontrolled environment 510. The computing system may process the image data 504 and 508 captured during and for use in performing inspections (i) of the DPM symbol, and (ii) the parts on which the DPM symbol are marked, in accordance with the principals described herein. The computing system 502 may include a processing unit 512 that executes software 514 for performing functionality, as further described herein. The processing unit 512 may include one or more processors, including general, image, signal, or other processing devices.

The processing unit 512 may be in communication with the memory unit 516 that is configured to store data, such as processed image data in determining (i) grades for each metric of a profile for a DPM symbol and (ii) grades for metrics when inspecting the DPM symbol in an uncontrolled environment. The processing unit 512 may further be in communication with an input/output (I/O) unit 518 that is configured to communicate data via a communications network, such as a local or wide area wired or wireless communications network. A storage unit 520 in communication with the processing unit 512 may be configured to store (i) the grades a profile for a DPM symbol of a "golden" sample and (ii) data captured during inspection of DPM symbols imprinted on other parts during production. The storage unit 520 may be configured to store data repositories 522a-522n (collectively 522) for storing data associated with one or more DPM symbols and any data derived therefrom during production optical inspection or otherwise.

Figure 11A:
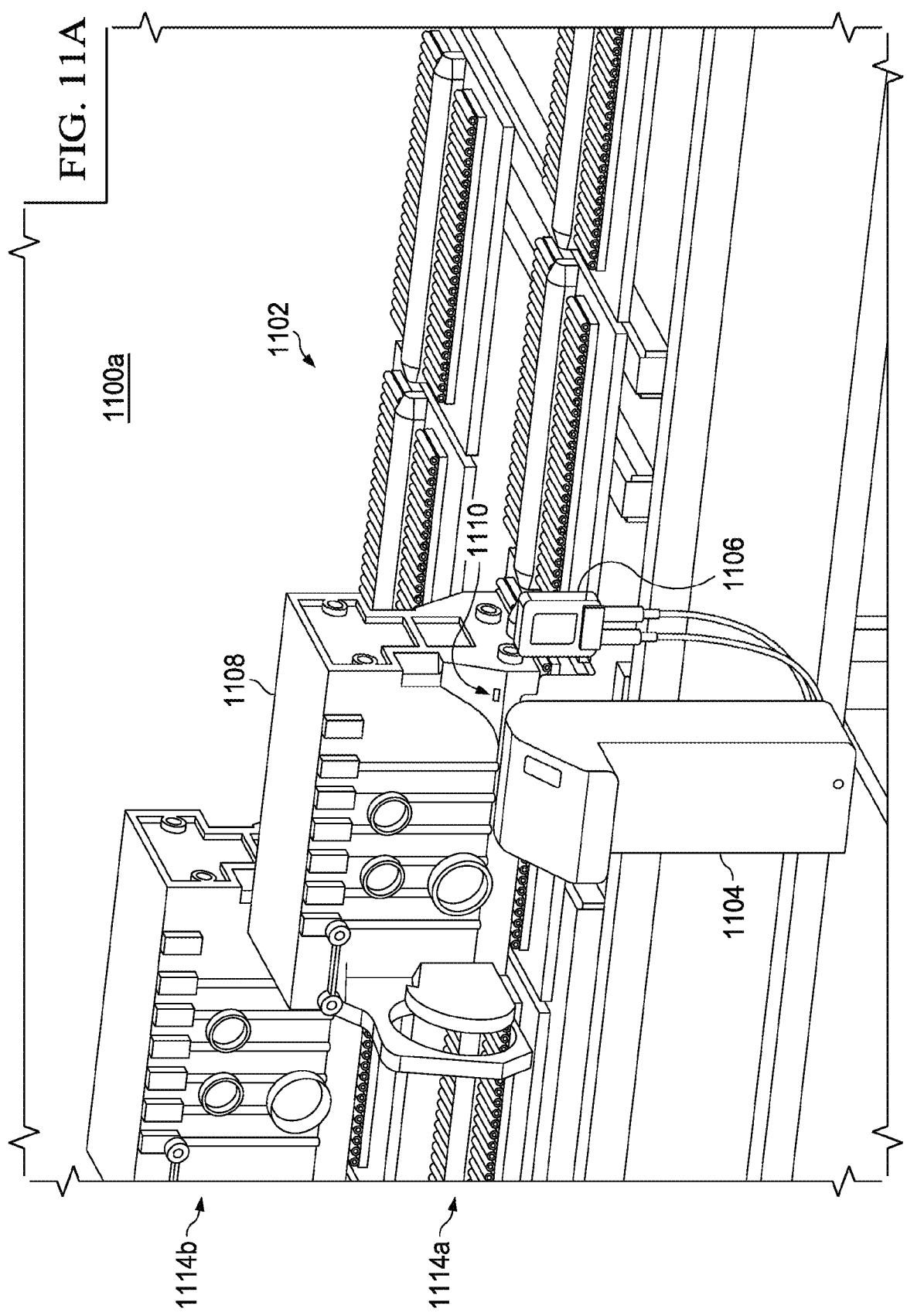
Figure 11C:
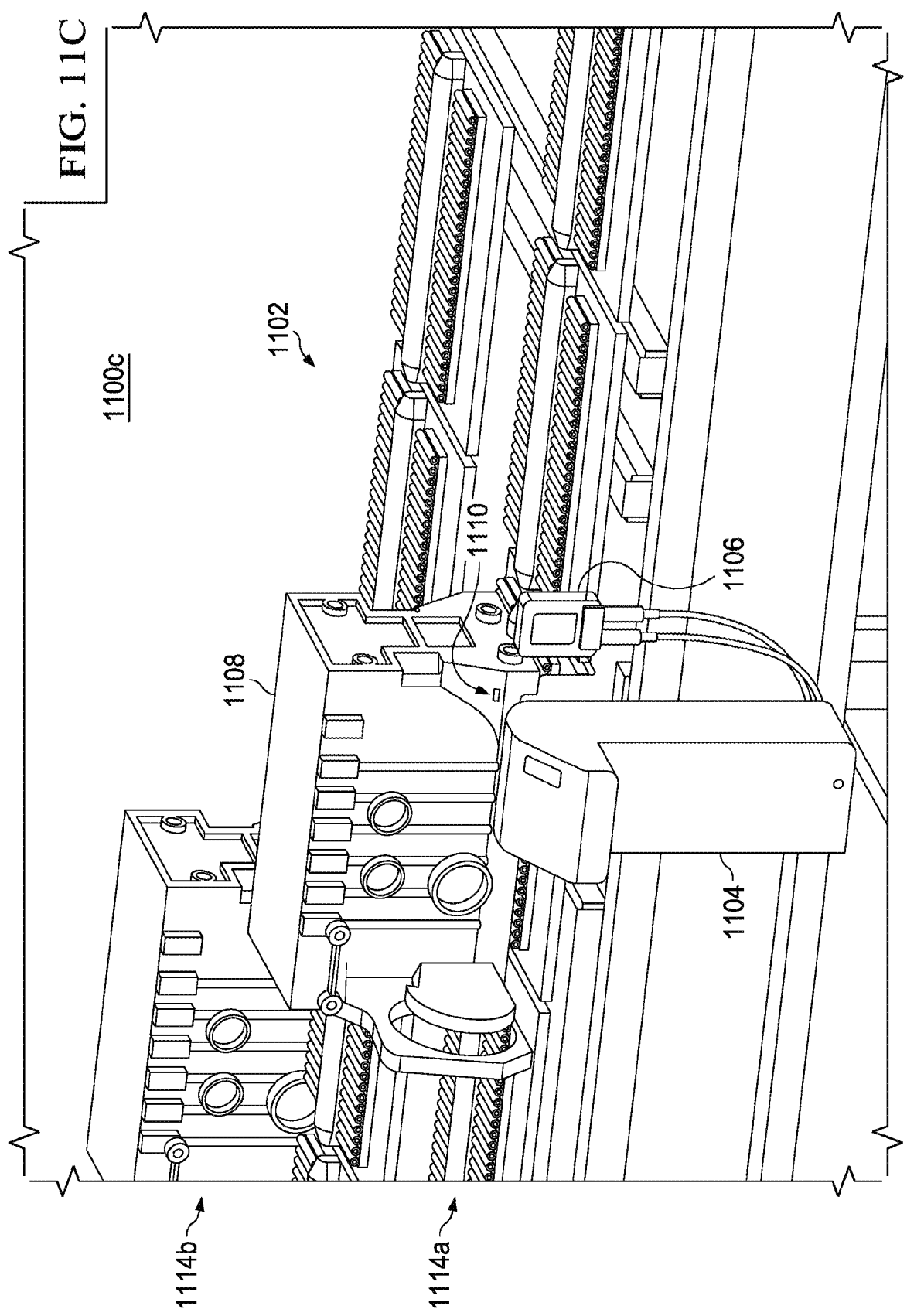

In an alternative embodiment, which may be a primary embodiment, rather than communicating the image data 508 from the barcode reader 505 to the computing system 502, the barcode reader 505 may be configured to process images and compute metric grades. The metric grades computed by the barcode reader 505 may be communicated to the computing system 502 to compare with the profile of acceptable grades for the metrics, as further described with regard to FIG. 6. In yet another embodiment, the barcode scanner 505 may have the profile stored therein, and be configured to scan, image or signal process to determine individual metrics, and compare the determined individual metrics to the individual metrics of the profile of the "golden" sample. Depending on a configuration of the production equipment, the computing system 502 or the barcode reader 505 may be configured to control production equipment used to control imprinting (e.g., laser etching) in response to determining that a grade of one or more metrics of a barcode or DPM symbol that is read by the barcode reader 505 pass(es) or fail(s). As an example, in response to determining that a grade of a metric fails, as further described herein, the computing system 502 or barcode reader 505 may instruct production equipment to move the part associated with the barcode to a "pass" location (see FIG. 11B) or a "fail" location (see FIG. 11D).

The quality grading of DPM symbols may be based on the grading of several individual metrics measured by optical inspection, as shown in TABLE I below.

TABLE I

| DPM Symbol Measurement Metrics |
|---|
| Decode |
| Cell Contrast |
| Cell Modulation |
| Unused Error Correction |
| Print Growth |
| Axial Non-Uniformity |
| Grid Non-Uniformity |
| Fixed Pattern Damage |
| Minimum Reflectance |

Each metric may be assigned a grade from the set {A, B, C, D, F}. It should be understood that alternative sets of grades, such as numerical grades, may be utilized. Any set of grades that are consistent with industry standards may be utilized. In accordance with the principles described herein, the individual metrics and acceptable grades set or assigned thereto may be used to accept or reject parts during production inspection. The individual metrics grades or values may also be set to ignore those metric(s) to avoid rejecting parts based on an individual metric that is immaterial to a part on which a DPM symbol is marked.

Although the principles described herein provide for determining grades for individual metrics and using those grades in determining whether a DPM symbol passes or fails, the principles may additionally be configured to determine an overall grade by selecting a minimum grade from among all of the metrics that have been identified as being available for use in performing grading and exclude metric(s) that are identified as not being used for performing grading (e.g., "Not Controlled"), as described below. The overall grade of the metrics identified as being available for use in performing grading may thereafter be used for accepting or discarding a part marked with a DPM symbol.

Typically, a sample is used as the "golden" sample, and is measured using a "verifier" in a controlled environment to create an "official grade." In accordance with the principles provided herein, each individual metric may be assigned an official grade calculated by the verifier.

Thereafter, when the "golden" sample is presented to a scanner in an uncontrolled environment, the measured grade can be different from what has been measured by the verifier. One embodiment of a process for creating and using a "golden" sample to generate a profile of acceptable grades for the metrics is provided in FIG. 6.

Figure 6:
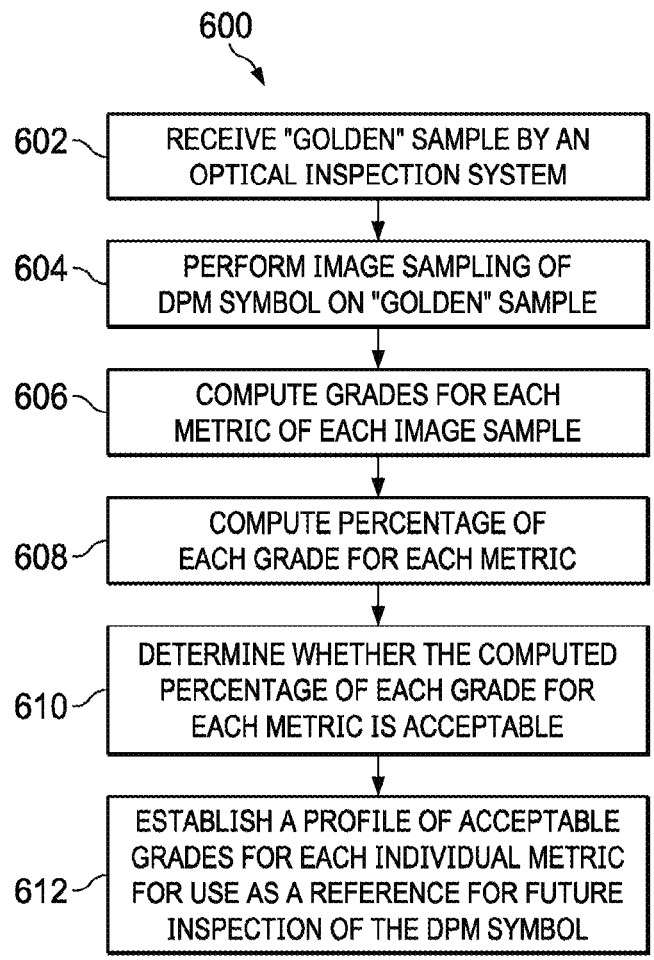
FIG. 6 is a flow diagram of an illustrative metric quality grade profile or metric profile establishment process.

With regard to FIG. 6, a flow diagram of an illustrative profile establishment process 600 is shown. The process 600 may start at step 602, where a "golden" sample is received by an optical inspection system. At step 604, the system may execute a large number of acquisitions, such as between 100 and 1000, and compute a grading for each image at step 606. Other numbers of samples may alternatively be utilized in accordance with the principles herein. The grading may include grades for each metric of each image sample. The grading of each metric may use computations defined by standards, as understood in the art. Due to the fact that the working or uncontrolled environment is not a controlled environment, the values or grades for each metric may be different, generally lower, from the values measured by the verifier. In addition, the instabilities of the uncontrolled environment can produce different, unrepeatable, and/or varying grades if the sampling is repeated several times. In an embodiment, a full sampling and grading process may take a time between seconds and a few minutes depending from the number of samples captured.

At step 608, the system may collects a percentage of each grade (e.g., A=10%, B=27%, and C=63%) for each metric. At step 610, a selection as to whether the computed percentage of each grade for each metric is acceptable may be made. The determination is generally based on the lowest grade that is measured for each metric, as that grade may be used to reject a part thereafter. At step 612, a profile of acceptable grades, which is different for each metric, is defined. That is, a list of acceptable grades for each metric may be stored in a metrics quality grade profile (e.g., data structure) and used as a reference during optical inspection of the DPM symbol marked on parts. During production, when at least one of the metrics determined by optical inspection is determined to be lower than the minimum acceptable value defined in the profile, the part may be discarded.

TABLE II below may be used to present an example of how the process of FIG. 6 works. Suppose, for example, the "golden" sample overall grade is qualified by the verifier in a controlled environment as a grade B (i.e., the lowest grade of all of the individual metrics is a grade B). However, as an example, when the "golden" sample is presented to a scanner in an uncontrolled environment, the following statistics are collected.

TABLE II

"Golden" Sample Statistical Distribution in an Uncontrolled Environment

| Metric | A | B | C | D | F | Grade |
|---|---|---|---|---|---|---|
| CC | 98% | 2% | — | — | — | B |
| CM | 100% | — | — | — | — | A |
| UEC | 100% | — | — | — | — | A |

TABLE II-continued

"Golden" Sample Statistical Distribution in an Uncontrolled Environment

| Metric | A | B | C | D | F | Grade |
|---|---|---|---|---|---|---|
| ANU | — | 78% | 22% | — | — | C |
| GNU | — | 100% | — | — | — | B |
| FPD | 36% | 64% | — | — | — | B |
| MR | — | — | — | 20% | 80% | F |

The lower grades of the metrics can be explained by the fact that Axial Non-Uniformity (ANU) is, for example, suffering of a perspective distortion because the scanner is mounted with a certain angle respect to the DPM symbol marked part, and the Minimum Reflectance (MR) metric is poor because the illuminator of the scanner is not powerful enough.

As shown, the Minimum Reflectance accepted grade is "F," which actually means that this metric is not controlled. The profile therefore is the grade profile shown in TABLE III below. The profile may be automatically created, semi-automatically created, or manually created depending on how the system is configured and optionally based on specific knowledge of a production environment and inspection system that a user may want to use when the grade profile is created.

TABLE III

| Grade Profile | |
|---|---|
| Metric | Grade Profile |
| CC | B |
| CM | A |
| UEC | A |
| ANU | C |
| GNU | B |
| FPD | B |
| MR | Not Controlled |

Measurements of metrics of in-line quality grading may be made on a "golden" sample in the controlled environment such that the "golden" sample of a part may be measured in an uncontrolled environment, such as in manufacturing facility, to determine how the "golden" sample is measured in the uncontrolled environment versus the controlled environment. From the controlled environment, a metrics quality grade profile that has measured grades for each of the individual parameters may be set, and those profile values of the "golden" sample may be used to compare how metrics grade in an uncontrolled environment.

Figure 7:
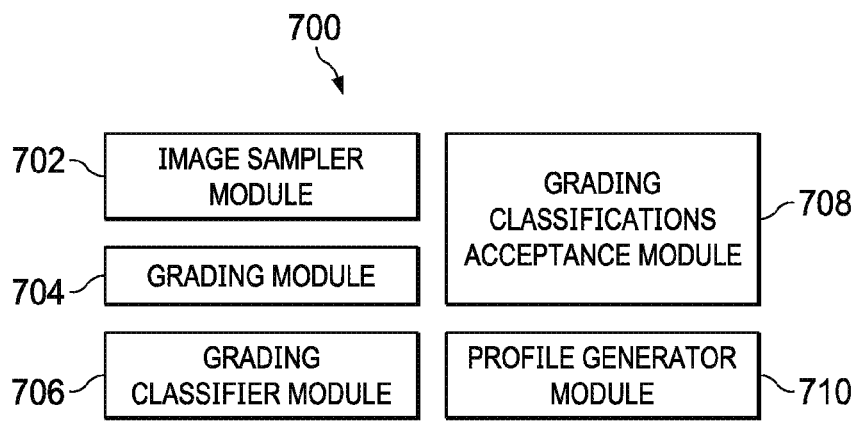
FIG. 7 is a block diagram of a set of modules that may be used to support creating and maintaining a metric profile.

With regard to FIG. 7, a block diagram of a set of modules 700 that may be used to support creating and maintaining a metric profile is shown. The process 700 may include individual metrics in measuring a DPM symbol and used to determine grading quality for performing visual inspection of the DPM symbol is shown. The modules 700 may include an image sampler module 702 that is configured to take samples of a "golden" sample in an uncontrolled environment. The image sampler module may be configured to capture many image samples (e.g., 100-1000) of a DPM symbol imprinted on a surface of the "golden" sample in the uncontrolled environment. The number of samples may vary depending upon (i) the part on which the DPM symbol is marked, (ii) the environment in which the images is being captured, or (ii) any number of other reasons.

A grading module 704 may be configured to measure each of the individual parameters and assign grades to those parameters for each sample captured by the image of sampler module. The grading module may be configured to calculate and assign a letter grade or any other grade format to each of the metrics for each of the samples.

A grading classifier module 706 may be configured to classify grades into bins or a histogram or table (see, for example, TABLE II), for example, that represents a statistical distribution of grades. That is, the module 706 may classify the grades and determine percentages of each grade for each of the metrics across each of the samples in an aggregated manner.

A grading classifications acceptance module 708 may be configured to enable a user to accept or otherwise adjust grading classification(s) that are determined by the grading classifier module 706. In an embodiment, the module 708 may enable a user to allow for a metric to be designated as "uncontrolled" in the event that the image sampler module 702 and imaging system (i.e., hardware in the uncontrolled environment) is unable to reproduce image quality and grades produced by the verifier of the "golden" sample in the controlled environment such that the grade is an "F." In such an instance, rather than having a high number of failures during production, a decision may be made as to ignore a metric, if appropriate. Thereafter, any time the metric is graded an "F" when measuring the DPM symbol, the inspection system may ignore that metric.

A profile generator module 710 may be configured to generate a profile or list of metrics and acceptable grades for each of the individual metrics. The profile generator module 710 may store the profile as structured data or non-structured data in a non-transitory memory of the inspection system for continued use thereby. Because the decision to scrap or not scrap parts that fail to meet the grade levels established by the grading classifications acceptance module 708, either or both of the modules 708 and 710 may enable the user to adjust the acceptable gradings (i.e., grades below which the inspection system will tag a part as a failure) of individual metrics during or after the profile generation process 700. The adjustments, of course, are to be made by a user who understands the meaning of the adjustments in terms of whether parts will physically fail (e.g., break or become deformed) in their real-world intended use (e.g., airplane engine part).

Figure 8:
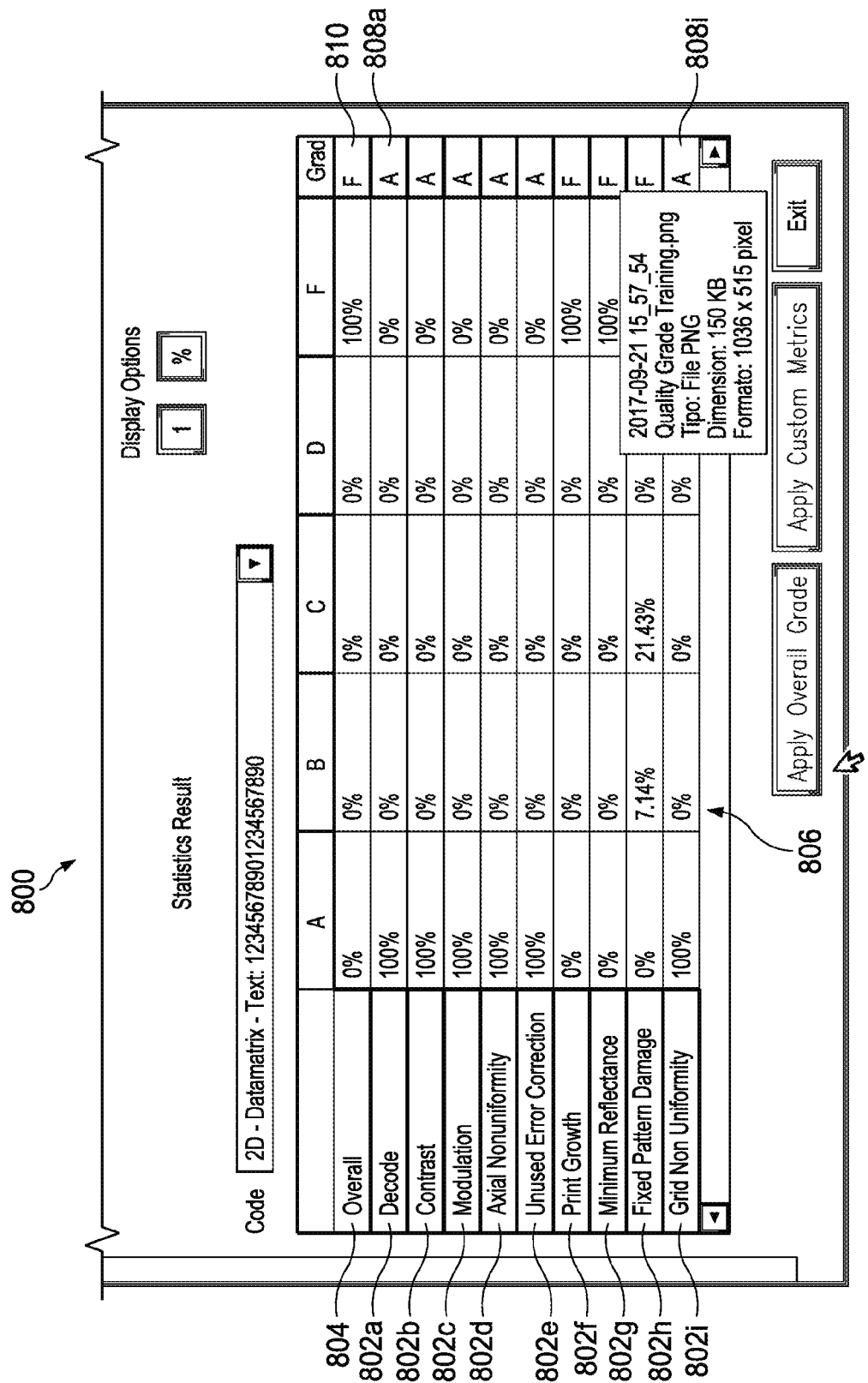
FIG. 8 is a screenshot of an illustrative user interface that shows measurements made of individual metrics and an overall metric.

With regard to FIG. 8, a screenshot of an illustrative user interface 800 that shows measurements made of individual metrics 802a-802i (collectively 802) and an overall metric 804 is shown. The screenshot may be used during a quality grade training session using a "golden" sample. During the training session, each of the metrics 802 receive an individual grade 808a-808i (collectively 808), and an overall grade 810 is determined by the lowest metric grade of each of the individual grades 808. The metrics 802 are shown with categories of grades "A"-"F" and measurements 806 for percentages collected from each image sample and applied to each of the grade categories "A"-"F." As shown, the fixed pattern damage (FPD) metric 802h is shown with percentages of measurements in three different grades, including grades "B" (7.14%), "C" (21.43%) and "F" (71.43%). The decode 802a, contrast 802b, modulation 802c, axial non-uniformity 802d, unused error correction 802e, and grid non-uniformity 802i metrics each have grades of "A" as a result of the samples all being graded "A" using conventional measurement standards. As a result of there being any levels of "F" values for the FPD metric 802h, the FPD metric 802h receives a grade 808h of "F." Also shown, print growth (PG) metric 802f has a grade 808f of "F" (100%), and minimum reflectance (MR) metric 802g has a grade 808*g* of "F." As a result, the overall grade 810 of the "golden" sample is an "F."

Figure 9:
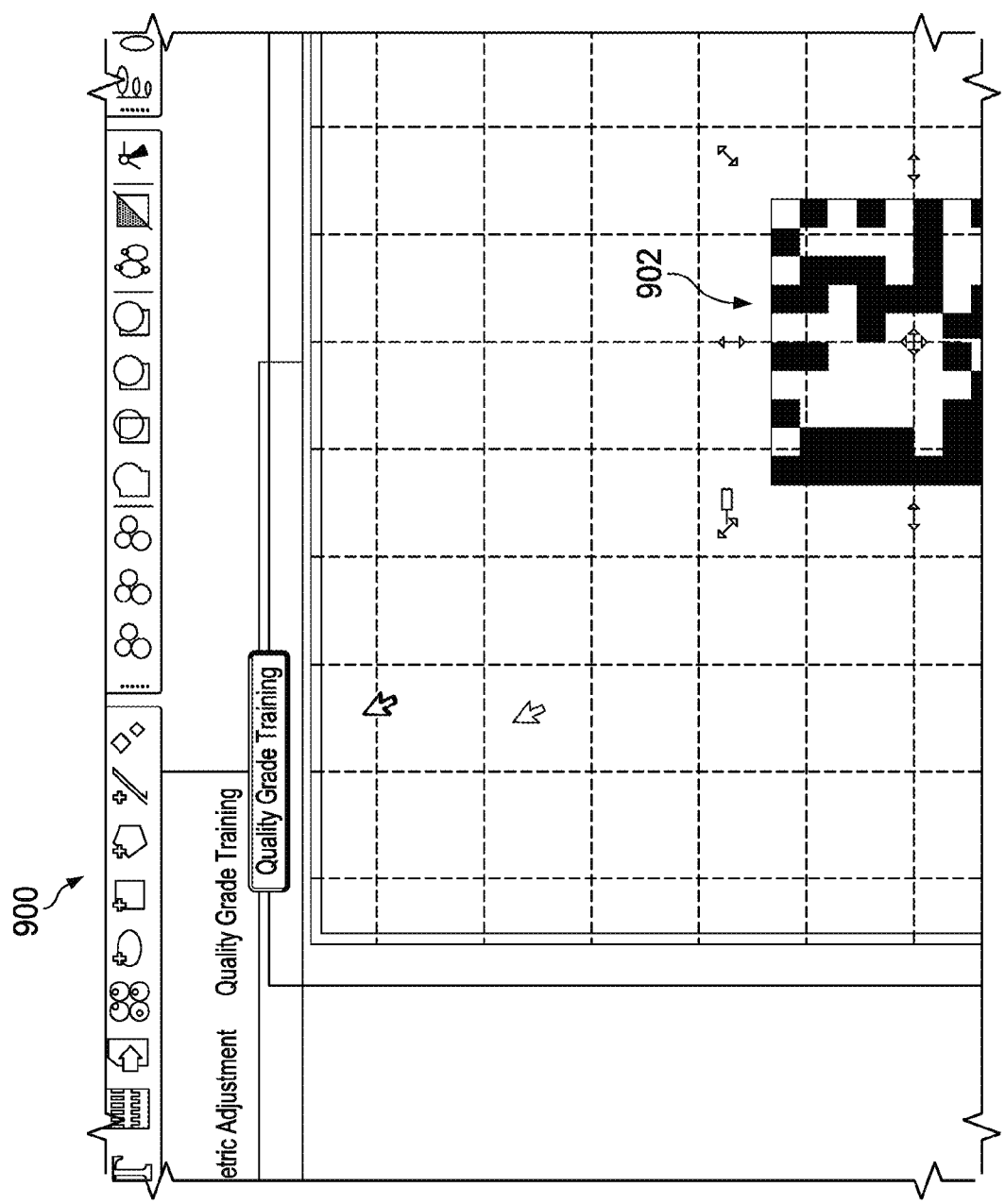
FIG. 9 is a screenshot of an illustrative training image showing a DPM symbol pattern.

With regard to FIG. 9, a screenshot of an illustrative training image 900 of a DPM symbol pattern 902 of a "golden" sample is shown. The DPM symbol pattern 902 shows what the marking is supposed to look like for training purposes. In an embodiment, the pattern 902 may enable a user to visually inspect the marking on the "golden" sample or a product being tested with the DPM symbol pattern 902. In an embodiment, the DPMs symbol pattern 902 may be used for comparison purposes, and actual measurements of a DPM symbol marked on a part that differ from the DPM symbol pattern 902 may be used to display differences as an overlay or beside the DPM symbol pattern 902 to show or highlight for a user differences between the design of the DPMs symbol pattern 902 and the measured DPM symbol.

Figure 10A:
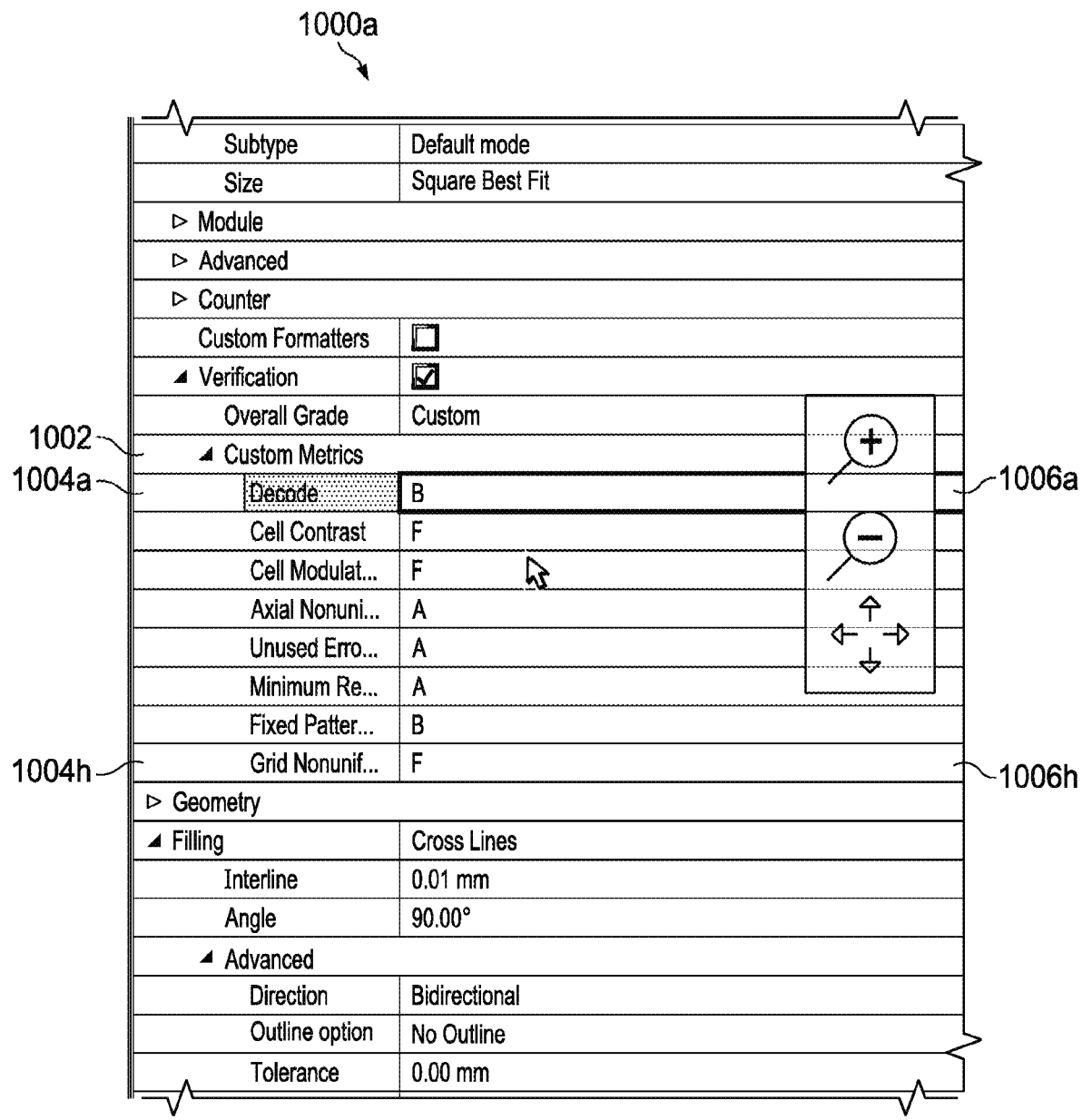
FIGS. 10A-10C are screenshots of illustrative user interfaces to enable a user to view and adjust acceptable metric grades.
Figure 10B:
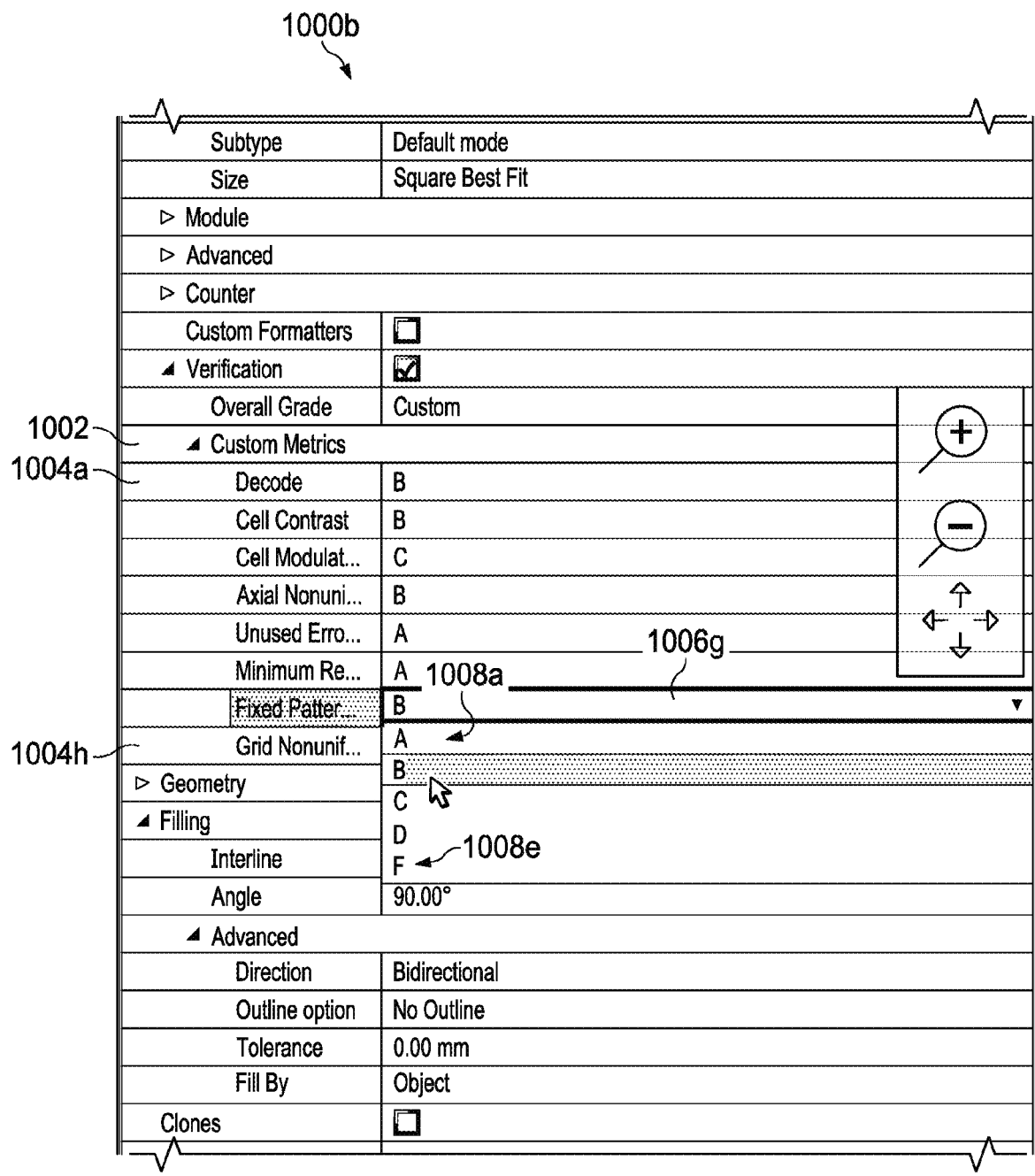
Figure 10C:
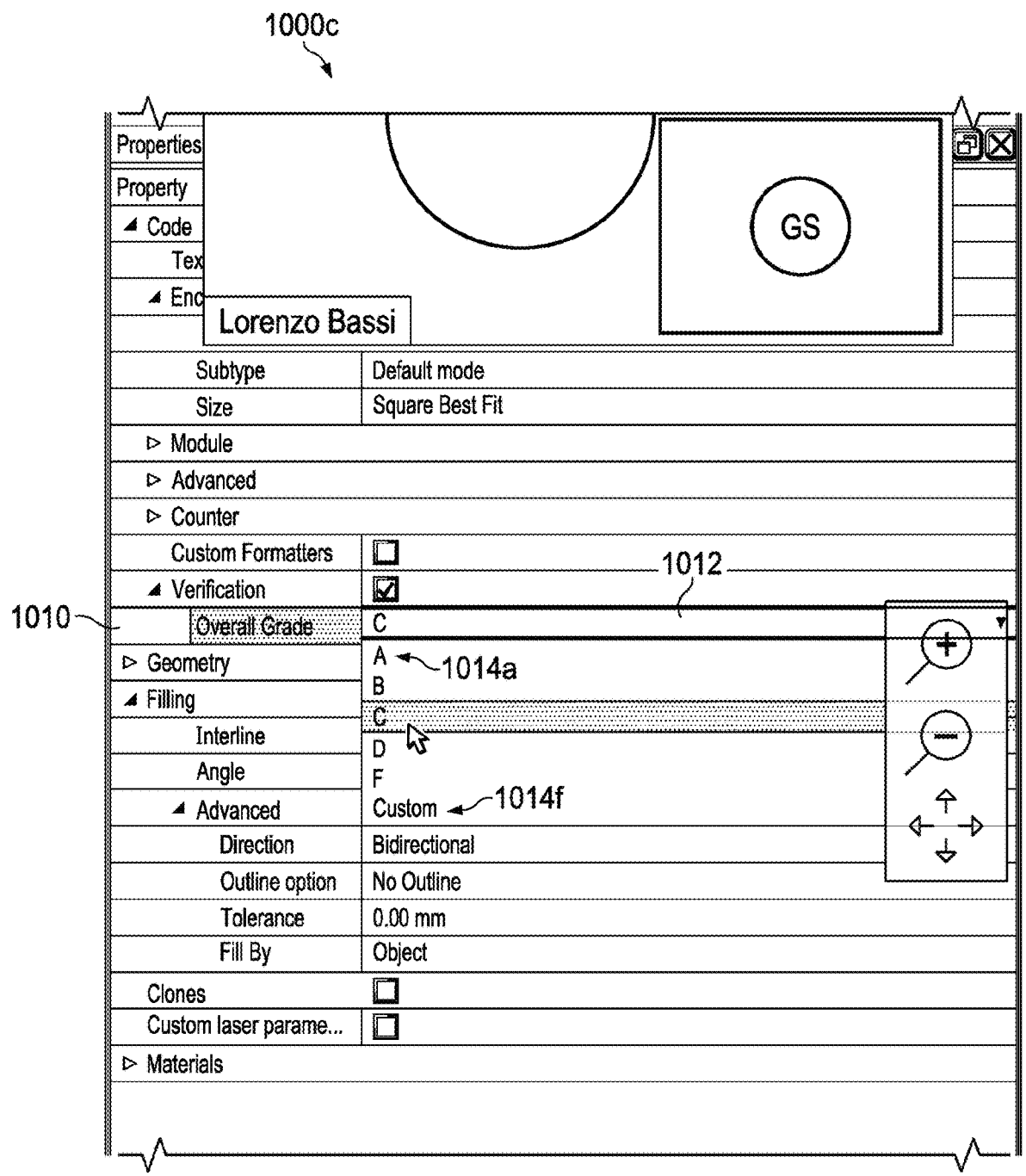

With regard to FIGS. 10A-10C, screenshots of illustrative user interfaces 1000*a*-1000*c* to enable a user to view and adjust acceptable metric grades are shown. The user interfaces 1000*a* and 1000*b* may be part of or in communication with the grading classifications acceptance module 708 and/or profile generate a module 710 of FIG. 7. With specific regard to FIG. 10A, a custom metrics user interface element 1002, in this case a pull-down menu, may enable a user to view metrics 1004*a*-1004*h* (collectively 1004) available for use in an inspection process. Each of the metrics 1004 may have selectable fields 1006*a*-1006*h* (collectively 1006) to enable grades for each of the metrics 1004 to be viewed, selected, and adjusted. As shown, the grades may range from A-F, but other grade values or symbols may be utilized. The field 1006*a* is shown to be highlighted as a user has selected that field 1006*a* to adjust the grade from an "A" to a "B," for example.

With regard to FIG. 10B, the user is shown to have selected the field 1006*g* to be able to select an acceptable grade from any of the grades 1008*a* ("A")-1008*e* ("F"). By enabling the user to select and set any of the individual grades 1006, the user may define tolerances of individual metrics 1004 that are acceptable or not acceptable for a given part on which the DPM symbol is imprinted.

With regard to FIG. 10C, a screenshot of an illustrative user interface 1000*c* with an overall grade metric 1010 and an associated selectable grade field 1012 is shown. The selectable grade field 1012 may be a selectable graphical user element, in this case a drop-down menu, that enables a user to select an overall grade 1014*a* ("A")-1014*f* ("custom"). By enabling the user to select the overall grade metric 1010 below which a part is determined to have failed, the user may override individual metric grades 1006 that may have been set in user interfaces 1000*a* and 1000*b*.

With regard to FIGS. 11A-11D, illustrations of illustrative materials handling equipment 1102 on which a processing system 1104 in communication with a barcode reader 1106 configured to read DPM symbols is shown. The materials handling equipment 1102 is configured to automatically transport parts 1108 during production and inspection. In an embodiment, the processing system 1104 may include a laser (not specifically identified) configured to imprint or laser etch a DPM symbol (e.g., machine-readable indicia and/or text) 1110 into the parts 1108. The processing system 1104 in conjunction with the barcode reader 1106 may read the DPM symbol 1110 on the parts 1108 and compute grades of metrics of a grade profile, as previously described. In an embodiment, in response to the reader 1106 reading the DPM symbol 1110, an indicator 1112, such as a light, may indicate that the reading passed (e.g., green light) or failed (e.g., red light). Other indicators, including an audible indicator, may additionally and/or alternatively be provided on the processing system 1104. The materials handling equipment 1102 includes a first path 1114*a* and a second path 1114*b* on which parts 1108 that respectively pass or fail inspection are moved. A third path or bypass path 1114*c* may be used to move parts that fail inspection from the first path 1114*a* to the second path 1114*b* for elimination of the part from the production line. It should be understood that any configuration of materials handling equipment 1102 that may have automated routing of parts based on an automated inspection process may be utilized.

In operation, if a part is marked with a DPM symbol and a subsequent reading of the symbol results in a passing grade after comparing individual metrics calculated during a read of the DPM symbol to individual metrics of the profile, then the part may continue being moved along the first path 1114*a*. If a part is marked with a DPM symbol and a subsequent reading of the symbol results in one or more metrics receiving a failing grade by comparing grades of the metrics with the grade profile, then the processing system 1104 (or other processing system) may control or cause control of the equipment 1102 to route the part 1108 along the third path 1114*c* to move the part 1108 onto the second path 1114*b*. If a read of the DPM symbol 1110 results in a passing grade, then a first action (e.g., moving the part in-line, storing a passing grade in association with a part identifier, and/or otherwise) may be taken. Otherwise, if a determination that a grade of a metric of a profile is below an acceptable grade, then an action may be taken (e.g., automatically moving the failed part from the first path 1114*a* (in-line) to the second path 1114*b* (out-of-line)).

Parts 1108 that end up on the second path 1108 may be scrapped or otherwise removed from the in-line. Alternatively, the DPM symbol on the parts 1108 that fail may have a DPM symbol re-imprinted thereon and/or have the DPM symbol marked as "VOID" or otherwise. As a result of comparing individual metrics of the profile, processing of parts may result in more accuracy as a user that establishes acceptable values of each metric may have more insight into the measuring equipment and production environment, thereby potentially producing higher yields.

One embodiment of a computer-implemented process for inspecting direct part marking (DPM) symbols may include receiving an image of a DPM symbol on a part. Grades of individual metrics from the image may be determined. A determination as to whether any of the grades of the metrics are below acceptable grades from a profile of the respective metrics may be made. In response to determining that a grade of a metric is below an acceptable grade, initiate an action in processing the part, otherwise, the action may not be initiated. In an alternative embodiment, a failure flag may be stored to indicate that the grade of the metric is below the acceptable grade. The failure flag may be any computer identifier used to denote that a grade of a metric is below the acceptable grade of that metric. The failure flag may be stored in association with an identifier of the part to enable a report inclusive of metrics with grades that were below the acceptable grade to be generated.

The process may also include enabling a user to establish an acceptable grade for each of the metrics, and storing the user-established acceptable grades. A user interface may enable a user to set a value for a specific metric to be ignored to avoid determining that metric measurements failed (e.g., due to being uncontrolled). An overall metric may be calculated or determined based on the metrics that are not set to be ignored. In an embodiment, the profile of acceptable grades may automatically be generated by selecting a lowest grade for each metric measured from a plurality of measurements on a "golden" sample.

In an embodiment, official metrics measured in a controlled environment for a "golden" sample may be stored. Measurements of the DPM symbols of the "golden" sample may be performed. Measurements of the metrics of the "golden" sample in an uncontrolled environment may also be performed. Statistical distribution of metrics may be calculated from the uncontrolled environment. The official metrics from the controlled and the statistical distribution of metrics from the uncontrolled environment may be compared. Metrics that are lower in the uncontrolled environment may be identified, and the user may be enabled to set an acceptable grade for the metrics that are lower.

A list of part identifiers and measured individual metrics associated with the part identifiers may be generated. A determination as to whether any of the individual metrics are degrading over multiple parts being inspected may be made, and a report that indicates that an individual metric is trending downward over time may be generated. The report may be in any electronic or printed format. A DPM symbol of a part indicative of an identifier of the part in an uncontrolled environment may be read. The memory may be accessed to automatically determine whether the identifier is associated with a "golden" sample.

One embodiment of a computer-implemented process of producing a metric quality grade profile for use during inspection of DPM symbol marked on parts may include storing official metrics measured in a controlled environment for a "golden" sample. Measurements of the DPM symbol of the "golden" sample may be performed. Measurements of the metrics of the "golden" sample in an uncontrolled environment may be performed. Statistical distribution of metrics from the uncontrolled environment may be calculated. The official metrics from the controlled and statistical distribution of metrics from the uncontrolled environment may be compared. An acceptable grade may be set for the individual metrics. The setting of the acceptable grade may be performed by a user manually, semi-automatically, or automatically. The acceptable grades for the individual metrics as a profile of the DPM symbol may be stored in a non-transitory memory.

A metric value in the uncontrolled environment that is lower than the official metric in the controlled environment may be highlighted (e.g., using any font or graphical user interface highlighting technique desired). A user may be enabled to set an acceptable grade for an individual metric that allows an inspection system to ignore the individual metric. The official metrics may automatically be generated by selecting a lowest grade measured from a plurality of measurements for each respective metric on a "golden" sample. Historical data of each of the individual metrics as measured during an inspection process may be collected. Trends of the measurements of the individual metrics may be determined, and a notice may be generated in response to determining that the measurements of an individual metric is trending downwards.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

The invention claimed is:

1. A system for inspecting direct part marking (DPM) symbols, comprising:
   an imaging device configured to capture images of DPM symbols on parts being processed by equipment;
   a non-transitory memory configured to store a profile inclusive of acceptable grades for each of a plurality of individual metrics of the DPM symbols; and
   a processing unit in communication with said imaging device and said non-transitory memory, and configured to:
      store, in the non-transitory memory, official metrics measured in a controlled environment for a "golden" sample;
      receive, from the imaging device, a captured image of a DPM symbol on a part;
      image process the captured image to perform measurements of the DPM symbol of the "golden" sample and determine a grade of each of the individual metrics of the imaged DPM symbol based on calculate statistical distributions of the individual metrics from an uncontrolled environment;
      for each of the metrics, compare the official individual metrics from the controlled environment and the statistical distributions of the individual metrics from the uncontrolled environment to determine whether a determined grade of the corresponding metric of the imaged DPM symbol is below the acceptable grade of the corresponding metric; and
      identify the individual metrics that are lower in the uncontrolled environment, and in response to determining that a grade of a corresponding metric the imaged DPM symbol is below an acceptable grade for the corresponding metric, communicate a first signal to the equipment for the equipment to perform a first physical action in processing the part, otherwise, communicate a second signal to the equipment for the equipment to perform a second physical action in processing the part.

2. The system according to claim 1, wherein said processing unit is further configured to:
   enable a user to establish an acceptable grade for each of the metrics, at least one of the acceptable grades being different from at least one of the other acceptable grades; and
   store the user-established acceptable grades in the non-transitory memory.

3. The system according to claim 2, wherein said processing unit is further configured to enable a user to set a value for a specific metric to be ignored to avoid determining that the specific metric failed during inspection.

4. The system according to claim 3, wherein said processing unit is further configured to calculate an overall metric based on the individual metrics that are not set to be ignored.

5. The system according to claim 1, wherein said processing unit is further configured to automatically generate the profile of acceptable grades by selecting a lowest grade measured on a set of a plurality of measurements on the "golden" sample for each metric.

6. The system according to claim 1, wherein said processing unit is further configured to generate a list of part identifiers and measured individual metrics associated with the part identifiers.

7. The system according to claim 1, wherein said processing unit is further configured to:
   determine whether any of the individual metrics are degrading over multiple parts being inspected; and
   generate a report that indicates that an individual metric is trending downward over time.

8. The system according to claim 1, wherein the individual metrics include one or more of a decode metric, a cell contrast metric, a cell modulation metric, an unused error correction metric, a print growth metric, an axial non-uniformity metric, a grid uniformity metric, a fixed pattern damage metric, or a minimum reflectance metric.

9. The system according to claim 1, wherein the grade of each of the individual metrics is one of a letter grade or a numerical grade.

10. A computer-implemented method for inspecting direct part marking (DPM) symbols, comprising:
    storing official metrics measured in a controlled environment for a "golden" sample;
    performing measurements of the DPM symbol of the "golden" sample;
    receiving an image of a DPM symbol on a part;
    performing measurements of the metrics of the "golden" sample in an uncontrolled environment;
    calculating statistical distributions of metrics from the uncontrolled environment;
    comparing the official metrics from the controlled environment and statistical distributions of individual metrics from the uncontrolled environment and determining a grade of each of a plurality of individual metrics of the imaged DPM symbol;
    identifying individual metrics that have lower grades in the uncontrolled environment than in the controlled environment;
    for each of the metrics, determining whether a determined grade of the corresponding metric of the imaged DPM symbol is below the acceptable grade from a profile of the corresponding metric; and
    in response to determining that a determined grade of the corresponding metric is below the acceptable grade of that corresponding metric, communicating a first signal to equipment for the equipment to perform a first physical action in processing the part, otherwise, communicating a second signal to the equipment for the equipment to perform a second physical action in processing the part.

11. The method according to claim 10, further comprising:
    enabling a user to establish an acceptable grade for each of the individual metrics, at least one of the acceptable grades being different from at least one of the other acceptable grades; and
    storing the user-established acceptable grades.

12. The method according to claim 11, further comprising enabling a user to set a value for a specific metric to be ignored to avoid determining that the metric failed during inspection.

13. The method according to claim 12, further comprising calculating an overall metric based on the individual metrics that are not set to be ignored.

14. The method according to claim 10, further comprising automatically generating the profile of acceptable grades by selecting a lowest grade for each individual metric measured from a plurality of measurements on the "golden" sample.

15. The method according to claim 10, further comprising generating a list of part identifiers and measured individual metrics associated with the part identifiers.

16. The method according to claim 10, further comprising:
   determining whether any of the individual metrics are degrading over multiple parts being inspected; and
   generating a report that indicates that an individual metric is trending downward over time.

17. A computer-implemented method of producing a metric quality grade profile for use during inspection of a direct part marking (DPM) symbol marked on parts, comprising:
   storing official metrics measured in a controlled environment for a "golden" sample;
   performing measurements of the DPM symbol of the "golden" sample;
   performing measurements of the metrics of the "golden" sample in an uncontrolled environment;
   calculating statistical distributions of metrics from the uncontrolled environment;
   comparing the official metrics from the controlled environment and statistical distributions of metrics from the uncontrolled environment;
   setting an acceptable grade for each of the individual metrics that have lower grades in the uncontrolled environment than in the controlled environment;
   configuring an imaging system to perform inspection of direct part marking symbols by storing, in a non-transitory memory on the imaging system, the acceptable grades for the individual metrics as a profile of the DPM symbol;
   during inspection of an imaged DPM symbol on a part, accessing the acceptable grades for the individual metrics stored in the non-transitory memory;
   determining a grade of each of a plurality of individual metrics of the imaged DPM symbol;
   determining whether any of the grades of the individual metrics of the imaged DPM symbol is below a stored acceptable grade from the respective individual metrics; and
   in response to determining that a determined grade of an individual metric is below an acceptable grade of that metric, communicating a first signal to equipment for the equipment to perform a first physical action in processing the part, otherwise, communicating a second signal to the equipment for the equipment to perform a second physical action in processing the part.

18. The method according to claim 17, further comprising highlighting a metric from the uncontrolled environment in which the statistical distribution of the metric is lower in the uncontrolled environment than an official metric in the controlled environment.

19. The method according to claim 17, further comprising enabling a user to set an acceptable grade for an individual metric that allows an inspection system to ignore the individual metric.

20. The method according to claim 17, further comprising automatically generating the official individual metrics by selecting a lowest grade measured from a plurality of measurements for each respective individual metric on a "golden" sample.

21. A system for inspecting direct part marking (DPM) symbols, comprising:
   an imaging device configured to capture images of DPM symbols on parts being processed by equipment;
   a non-transitory memory configured to store a profile inclusive of acceptable grades for each of a plurality of individual metrics of the DPM symbols; and
   a processing unit in communication with said imaging device and said non-transitory memory, and configured to:
      store, in the non-transitory memory, official metrics measured in a controlled environment for a "golden" sample;
      perform measurements of the DPM symbol of the "golden" sample;
      perform measurements of the individual metrics of the "golden" sample in an uncontrolled environment;
      calculate statistical distributions of the individual metrics from the uncontrolled environment;
      compare the official individual metrics from the controlled environment and statistical distributions of the individual metrics from the uncontrolled environment;
      identify the individual metrics that are lower in the uncontrolled environment; and
      enable the user to set an acceptable grade for each of the individual metrics that have lower grades in the uncontrolled environment than in the controlled environment;
      receive, from the imaging device, a captured image of a DPM symbol on a part;
      image process the captured image to determine a grade of each of the individual metrics of the imaged DPM symbol;
      determine whether any of the determined grades of the individual metrics of the imaged DPM symbol are below the acceptable grades of the respective individual metrics; and
      in response to determining that of the individual metrics of the imaged DPM symbol is below an acceptable grade, communicate a first signal to the equipment for the equipment to perform a first physical action in processing the part, otherwise, communicate a second signal to the equipment for the equipment to perform a second physical action in processing the part.

22. A computer-implemented method for inspecting direct part marking (DPM) symbols, comprising:
   storing official metrics measured in a controlled environment for a "golden" sample;
   performing measurements of the DPM symbol of the "golden" sample;
   performing measurements of the metrics of the "golden" sample in an uncontrolled environment;
   calculating statistical distributions of metrics from the uncontrolled environment;

comparing the official metrics from the controlled environment and statistical distributions of individual metrics from the uncontrolled environment;

identifying individual metrics that have lower grades in the uncontrolled environment than in the controlled environment; and enabling the user to set an acceptable grade for each of the individual metrics that are lower;

receiving an image of a DPM symbol on a part;

determining a grade of each of a plurality of individual metrics of the imaged DPM symbol;

determining whether any of the grades of the individual metrics of the imaged DPM symbol is below an acceptable grade from a profile of the respective metrics;

in response to determining that a determined grade of an individual metric is below an acceptable grade of that metric, communicating a first signal to equipment for the equipment to perform a first physical action in processing the part, otherwise, communicating a second signal to the equipment for the equipment to perform a second physical action in processing the part.

* * * * *